(No Model.) 9 Sheets—Sheet 2.

F. H. RICHARDS.
WEIGHING MACHINE.

No. 589,284. Patented Aug. 31, 1897.

Witnesses,
R. W. Pittman
Fred. J. Dole.

Inventor,
F. H. Richards (No Model.)

F. H. RICHARDS.
WEIGHING MACHINE.

No. 589,284.

Patented Aug. 31, 1897.

Fig. 4.

Witnesses
R. W. Pittman
Fred. J. Dole.

Inventor
F. H. Richards.

(No Model.)  
9 Sheets—Sheet 4.

F. H. RICHARDS.
WEIGHING MACHINE.

No. 589,284.  
Patented Aug. 31, 1897.

Fig. 5.

Witnesses;  
R. W. Pittman  
Fred. J. Dole.

Inventor;  
F. H. Richards (No Model.) 9 Sheets—Sheet 5.
F. H. RICHARDS.
WEIGHING MACHINE.

No. 589,284. Patented Aug. 31, 1897.

Fig. 6.

Witnesses. Inventor.
R. W. Pittman F. H. Richards
Fred. J. Dole.

(No Model.)  9 Sheets—Sheet 6.

F. H. RICHARDS.
WEIGHING MACHINE.

No. 589,284. Patented Aug. 31, 1897.

Fig. 7.

Witnesses:
R. W. Pittman
Fred. J. Dole.

Inventor:
F. H. Richards (No Model.)  9 Sheets—Sheet 7.

F. H. RICHARDS.
WEIGHING MACHINE.

No. 589,284.  Patented Aug. 31, 1897.

Fig. 8.

Witnesses,
R. W. Pittman
Fred. J. Dole.

Inventor,
F. H. Richards (No Model.)

F. H. RICHARDS.
WEIGHING MACHINE.

No. 589,284.   Patented Aug. 31, 1897.

Witnesses
R. W. Pittman
Fred. J. Dole.

Inventor
F. H. Richards (No Model.) 9 Sheets—Sheet 9.

F. H. RICHARDS.
WEIGHING MACHINE.

No. 589,284. Patented Aug. 31, 1897.

Witnesses,
R. W. Pittman
Fred. J. Dole.

Inventor
F. H. Richards,

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,234, dated August 31, 1897.

Application filed May 17, 1897. Serial No. 636,937. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for weighing and delivering granular and similar substances, certain of the improvements being especially applicable to machines of the kind disclosed by Letters Patent No. 572,067, granted to me November 24, 1896.

One of the objects of the invention is to provide, in conjunction with weighing mechanism, overloading and load-reducing means embodying a movably-mounted hopper and means coöperative with said hopper for starting the load-reducing means in operation. In the present case said movably-mounted hopper, which is supported for reciprocation, is designed to supply an overcharge to the weighing mechanism, and the load-reducing means preferably comprehends as a part thereof a valve of suitable construction which is operated at the proper stage by the hopper, constituting an actuator for this purpose to cause the removal of the surplus from the load-receiver.

Another object of the invention is to furnish, in connection with the load-reducing valve and the actuator for operating the same, a device such as a rod for transferring the power of the actuator to the valve at a certain time in the descent of the load-receiver, whereby said valve will be opened to permit the surplus or overcharge to pass from the load-receiver, means being also provided for shifting said rod, preferably on the discharge of a load, so that the valve can be again opened by independent means to permit any material on the same or in the load-reducing spout, which is generally employed, to gravitate therefrom as such material forms a part of the load.

In the drawings accompanying and forming part of this specification.

Similar characters designate like parts in all the figures of the drawings.

Any suitable framework may be employed for supporting the various parts of the machine. Said framework is represented consisting of a chambered base 2, the side frames 3 and 4, and the brackets 5 and 6, extending oppositely from the stationary hopper H.

The weighing mechanism may be of any suitable type, it being in the present case of a construction similar to that illustrated and described in the Letters Patent hereinbefore referred to, and consisting of a load-receiver, such as G, and a plurality of counterweighted scale-beams, as B and B', upon which the same is mounted, said scale-beam being supported on the base 2.

The load-receiver preferably has an outlet in its lower end which is normally covered by a suitable closer, as L, consisting of a flat plate pivoted at one side of the discharge-outlet, as at 7, and furnished with a counterweighted arm 8 for shutting the same on the discharge of a load.

The closer L is normally maintained in its shut position by a suitable latch, as L', pivoted, preferably, to the load-receiver and adapted to engage a suitable member connected with the closer, as the arm 9 of the rocker or rocking lever L'', pivoted at 10 to the load-receiver, the opposite arm 12 of said lever being connected with the longitudinal link 13, pivoted at its lower end to the closer. The latch L' is of ordinary construction, it being counterweighted and shouldered, as at 14, the shoulder of the latch being designed to engage the arm 9 of the lever.

My present invention comprehends the employment, in conjunction with the load-receiver of the weighing mechanism, of overloading and load-reducing means of suitable kinds, preferably successively effective during the weighing of a load.

The overloading means is adapted to supply or deliver to the load-receiver G a mass or quantity of material in excess of or beyond the predetermined charge, the surplus being subsequently removed by the load-reducing means, and the remainder in the load-receiver, after the removal of the surplus or excess, constituting the true or predetermined load, is suitably discharged.

The overloading means in the present case comprises a vertically-reciprocatory hopper and a stream-controller coöperative therewith, said hopper furnishing the necessary power to actuate said stream-controller and also to start the load-reducing means in operation, as will hereinafter appear.

The reciprocatory hopper is designated by H', it having a reduced delivery end 15, whereby it will be caused to retain a sufficient quantity of material to insure its lowering or depression, the stream-controller to which I have referred being closed or shut on the downstroke of the hopper. The reciprocatory hopper H', which is vertically movable, is located with its upper end beneath the mouth of the fixed or stationary hopper, it being carried by the two arms 16 and 17, secured to the transverse rock-shaft 18, journaled in suitable bearings on the side frames 3 and 4, respectively, the two arms being pivoted, respectively, to the opposite sides of the said hopper. The reciprocatory hopper H' is furnished at its opposite sides with the upright arms 35 and 36, respectively, connected by guide-links 37 and 38 with the hopper H.

The action of the hopper H' is preferably controlled by the weighing mechanism, and for the purpose of minimizing the power for operating the same said hopper is preferably balanced, a slidable balance-weight 19 being carried by the arm 20, projecting rearward from the rock-shaft 18, said balance-weight being held in an adjusted position by the set-screw 21. When the material gravitates from the hopper H to enter the reciprocatory hopper H', the latter having a reduced outlet or end, the material will accumulate in said last-mentioned hopper and cause the same to descend, whereby it can furnish the necessary power for operating the overloading and load-reducing valves successively.

The overloading-valve is designated by V, it being of the "oscillatory-pan" type, the arms 22 and 23 of said valve being pivoted, as at 24 and 25, respectively, to the opposite sides of the hopper, and one of said valve-arms having a crank-arm, as 26, preferably connected to a suitable resistance device, as the bracket 5, whereby on the descent of the hopper H' in the manner specified the valve V will be advanced or shut to arrest the supply of material to the load-receiver.

The crank-arm 26 has pivoted thereto at its outer end the link 27, which is likewise connected to the bracket 5.

One arm of the scale-beam B' has pivoted thereto the actuator B'', the pivotal point being shown at 28, located near the poising end of the beam, said actuator being in the form of a shiftable counterweighted lever, the weight 29 of which is furnished with a stop 30, resting on the adjacent weight W' of the beam, whereby on the descent of the beam mechanism the extended end 30 of the actuator will act as a stop for preventing the hopper H' from descending too rapidly. When the actuator or lever B'' resumes its initial position, it returns or raises the hopper H' to its initial position. Said actuator is adapted to transfer its effect to the link or rod 31, bearing against the outer end of the same, said link been pivoted at its upper end to the arm 32, extending forward from the rock-shaft 18. When the weighing mechanism descends, the rod 31 will bear against the actuator B'', so that the latter acts to prevent the reciprocatory hopper from descending too rapidly.

Figure 1:
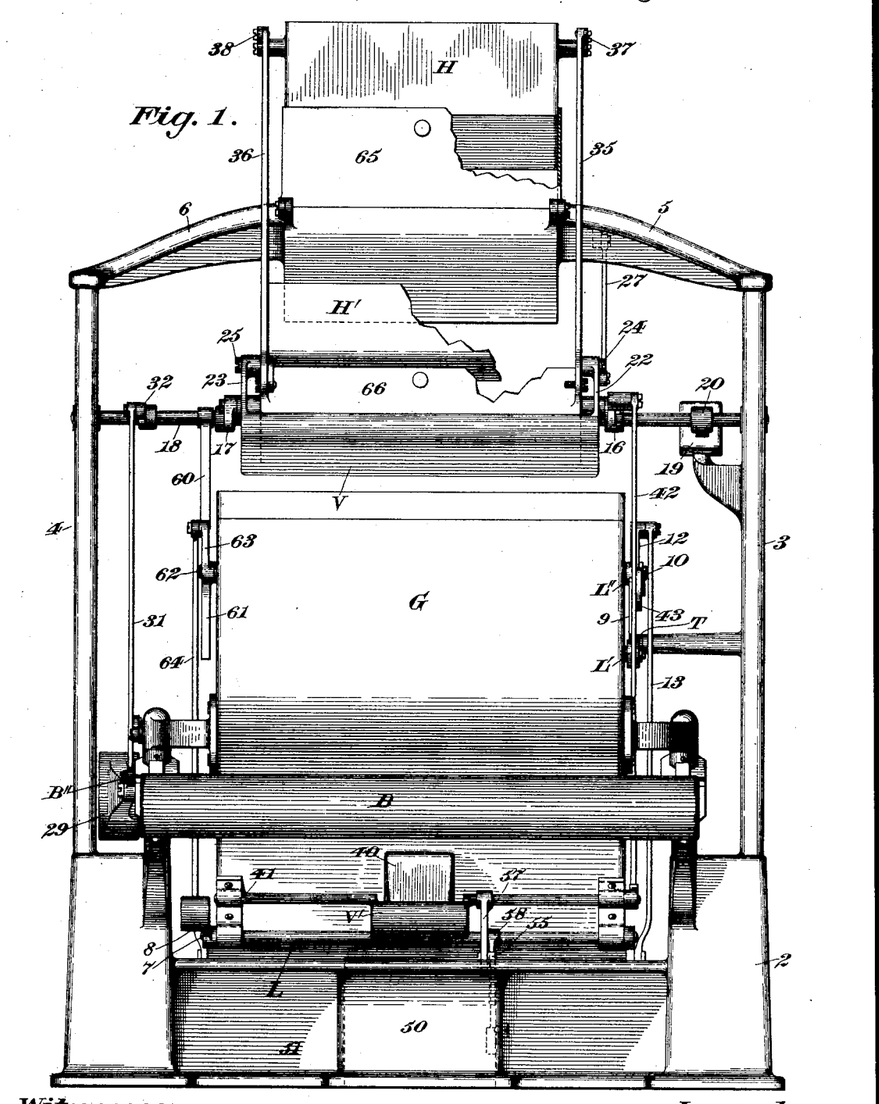
Figure 1 is a rear elevation of my improved weighing-machine.
Figure 2:
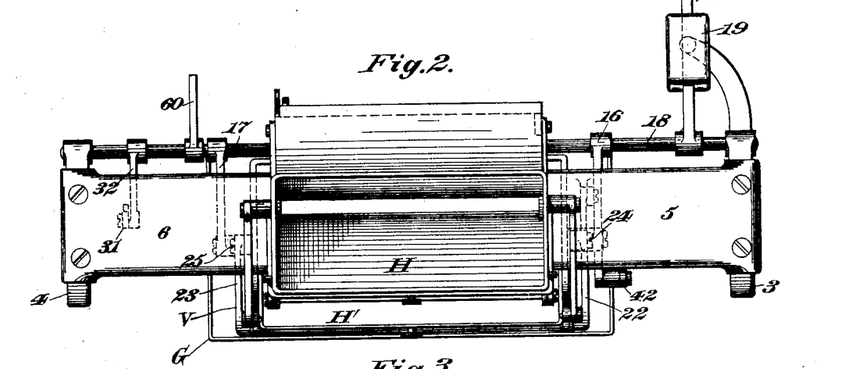
Fig. 2 is a plan view of the upper part of the machine.
Figures 3, 9:
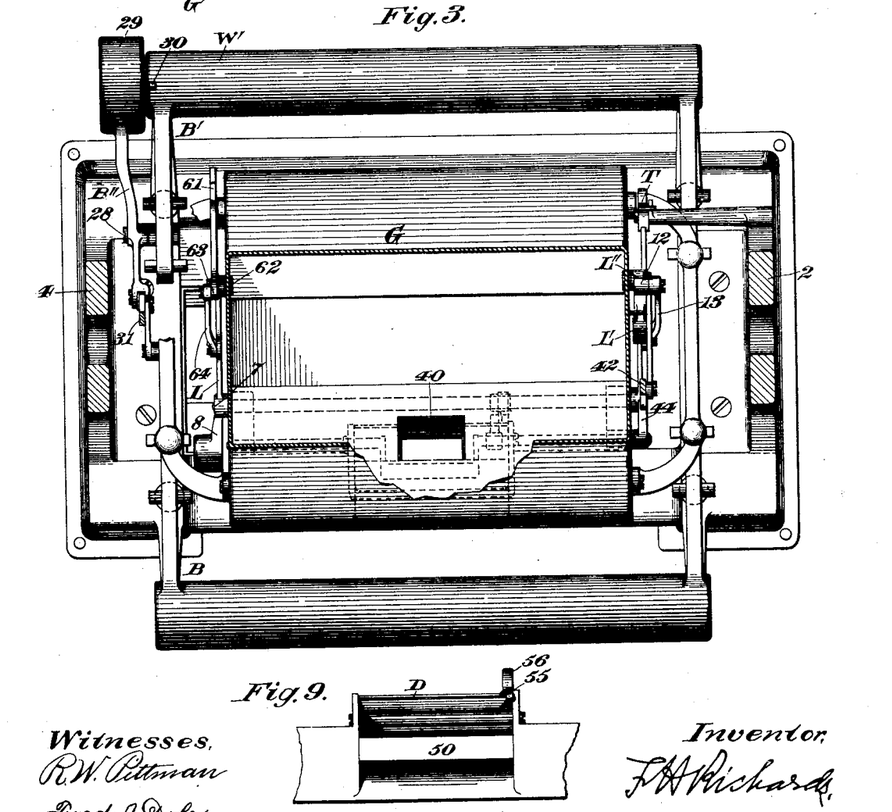
Fig. 3 is a sectional plan view of the same, taken in the line $a$ $a$, Fig. 4.
Fig. 9 is a plan view of a portion of the load-reducing means.

The hopper H' and valve V being in the positions shown in Fig. 1 a stream of large volume will enter the receiver G and at a certain stage the latter will be caused to descend, and the inner end of the actuator B'', falling away from the link or rod 31, will permit the hopper H' to drop by reason of the accumulation of material therein, and the valve V, by reason of its connection with the framework, is swung under the hopper to reduce and subsequently cut off the supply-stream, this operation being completed when the load-receiver is overloaded or overcharged, it being understood that the load-receiver in the interval has descended below the so-called "poising-line."

Figure 4:
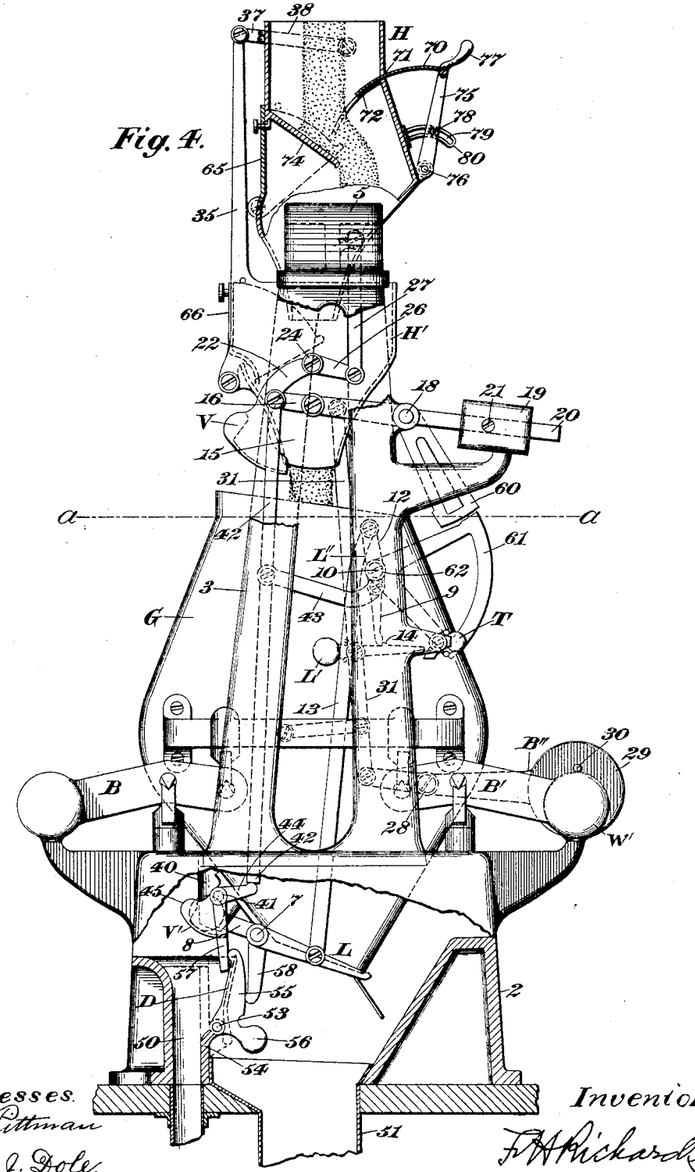
Figs. 4, 5, 6, 7, and 8 are side elevations as seen from the right in Fig. 1, showing the positions occupied by the parts during the making and discharging of a load.

The load-reducing means in the present case embodies as a part thereof a valve, preferably reciprocatory across an opening in the load-receiver, as the outlet of the load-reducing spout 40, projecting downward near the lower end of the load-receiver. The load-reducing valve is designated by V' and is carried by the two-part shaft 41, journaled in suitable brackets secured to the opposite sides of the load-receiver. Said valve normally covers the discharge-opening of the spout 40, as shown in Fig. 4, to permit the overcharging of the load-receiver, said valve being caused to open by power furnished by the hopper H', transferred through a suitable device, as the thrust-rod 42, said rod being pivoted at its upper end to the rock-arm 16 and connected by the link 43 to the arm 9 of the rocking lever L''.

Figure 5:
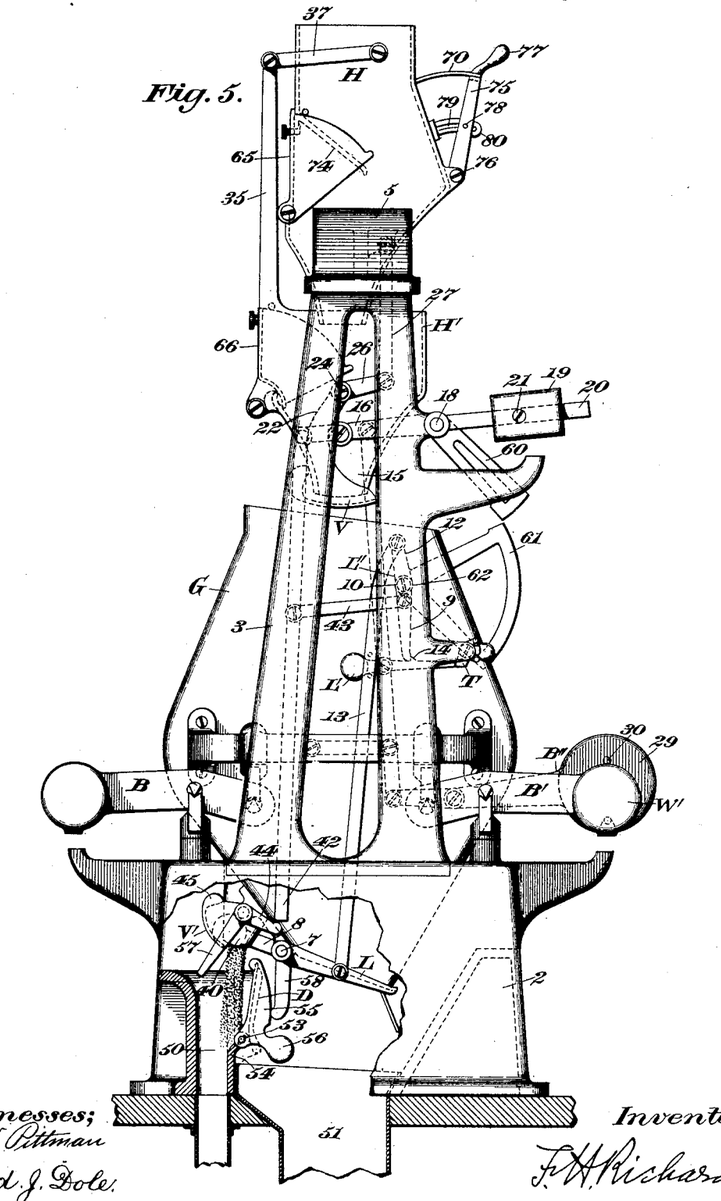

The shaft 41 has secured thereto an arm 44, disposed in the path of movement of the thrust-rod 42, whereby at a predetermined stage, or when the load-receiver has been overloaded, the rod 42, by acting against the arm 44, will rock said arm and consequently the shaft 41 to permit the surplus to pass from the load-receiver, as illustrated in Fig. 5, said load-receiver being caused to rise as the surplus is withdrawn therefrom, so that a suitable device, as the actuating-weight 45 on the valve, will cause the valve to close as the rod 42 rises, it being understood that said rod is elevated by reason of the actuator B″ acting against the rod 31 to rock the shaft 18 and consequently the arm 16.

A plurality of discharge-conduits are preferably employed, they being designated by 50 and 51 and are suitably secured below the weighing mechanism and adjacent to each other. The conduit 50 acts as a suitable means for receiving the surplus removed from the load-receiver during the weighing of a load, it being situated below the spout 40. The material delivered into the conduit 50 can be disposed of in the manner shown and described in the Letters Patent hereinbefore referred to.

In connection with the conduits 50 and 51 a deflector, as D, is provided, the same preferably consisting of a suitably-operated plate pivoted at 53 to the upper end of the cut-away wall 54 of the conduit 50, means being provided to hold the deflector in its normal and substantially vertical position, (illustrated in Fig. 4,) so that the material which is withdrawn from the load-receiver during the weighing of a load can enter the conduit. When the load is completed, it will be discharged into the conduit 51, the deflector D being first shifted to prevent any material from entering the conduit 50.

The deflector D has suitably secured thereto at one end the cam-arm 55, counterweighted as at 56, said cam-arm being contiguous to and situated between the rock-arms 57 and 58, secured, respectively, to the load-reducing valve V′ and the closer L, the two arms acting as stops to maintain the deflector in its normal position.

When the surplus is withdrawn from the load-receiver, the true load will be discharged therefrom, this operation being effected by the tripping of the latch L′, which releases the closer, whereby the mass in the receiver G, acting against said closer, will force the same open.

Figure 6:
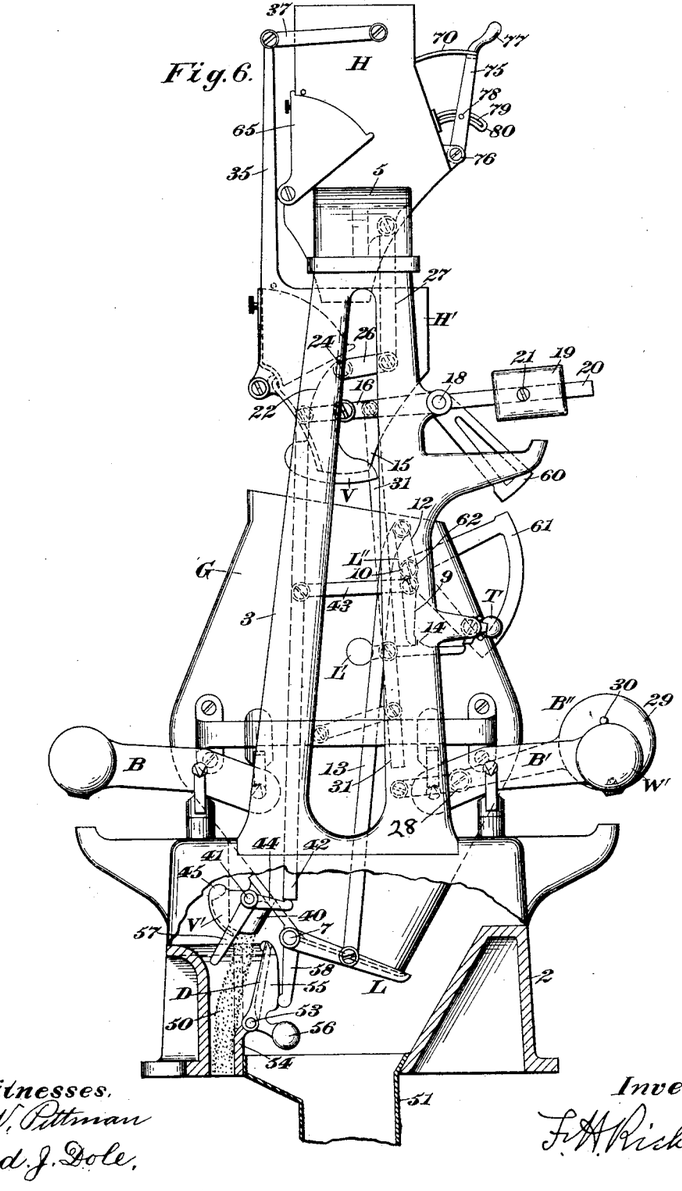

Any suitable means may be employed for tripping the latch, a by-pass tripper T, pivotally supported upon the framework, being shown for this purpose, said tripper being of the usual construction. When the load-receiver nearly reaches the end of its descending movement, the latch L′ will strike the by-pass tripper and swing the same to one side, as shown in Fig. 6. On the ascent of the load-receiver and when the surplus has been entirely withdrawn the latch will strike the tripper T, which is in the nature of an abutment, and the latch will be tripped and disengaged from the arm 9 of the lever L″, thereby releasing the closer.

On the discharge of the load means will act against the deflector or the cam 55 to swing the deflector into position to cover the outlet 50, and simultaneously with this operation the valve V′ will be opened to permit the material in the spout 40 and on said valve to pass therefrom into the conduit 51. The arm 58 on the closer serves as a means for simultaneously shifting the deflector and opening the valve, as just stated.

Figure 8:
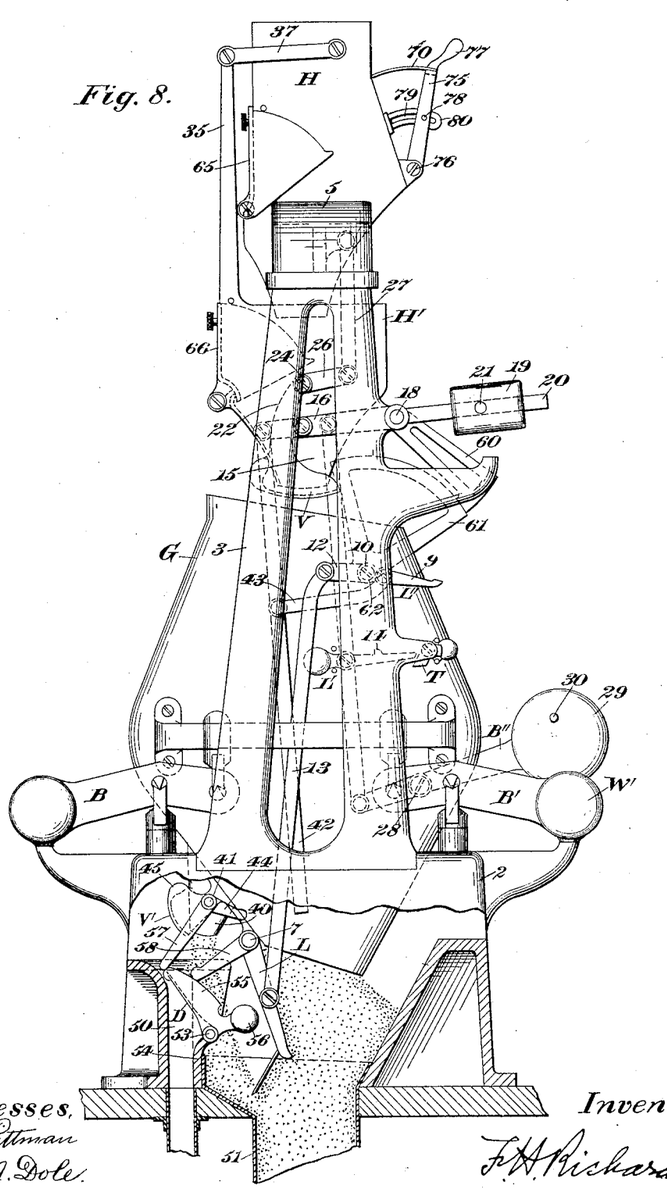
Figure 10:
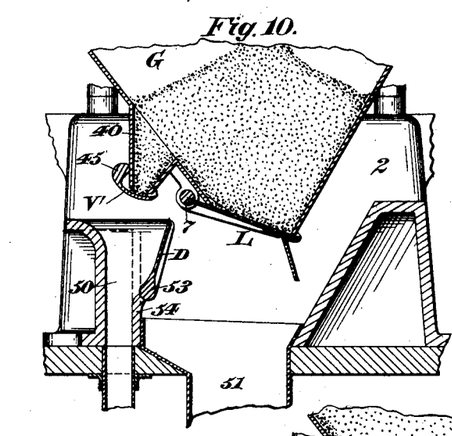
Figs. 10, 11, 12, 13, and 14 are longitudinal central sections of the lower end of the load-receiver and adjacent parts, the same being represented in positions corresponding, respectively, with Figs. 4, 5, 6, 7, and 8.

When the closer is open, as shown in Fig. 8, the arm 58, swinging rearward therewith, will ride along the working face of the cam 55 and move the latter in a coinciding direction, whereby the deflector will be operated to cover the outlet 50, and the upper end of the cam 55 being in contact with the valve-arm 57 the valve V′ will be swung open to permit the material in the spout to drop to the deflector D, from whence it is delivered into the conduit 51. The weight 56 on the shutting of the closer acts as a convenient means for returning the deflector D to its initial position.

Means will be provided for shifting the rod out of contact with the valve-arm 44 on the opening of the closer L, whereby said valve can be opened in the manner just specified.

The rod 42, as hereinbefore described, is connected with the lever L″ by the link 43, and it will be apparent that as the closer opens the rod 13 will be drawn downward and the lever-arm 9 oppositely oscillated, whereby the link 43 and rod 42 can be carried to the right, as shown in Fig. 8, said rod thereby being moved out of contact with the valve-arm 44.

In connection with the supply apparatus and the closer reciprocally-effective stops are provided, each being in position to block the action of the other. Said stops are designated, respectively, by 60 and 61, both being in the form of skeleton segments, the stop 60 being secured to the rock-shaft 18 and the stop 61 being pivoted at 62 to the load-receiver G. The stop 61 is furnished with a crank-arm 63, connected by a rod 64 with the closer. When the stream is flowing into the load-receiver G, the upper end of the stop 61 will be substantially in contact with the curved face of the stop 60, as shown in Fig. 4, so that should the latch L′ be tripped too soon the stop 61 can oscillate for a very short distance or until it abuts against the coöperating stop 60, which arrests its further movement, it being understood that the closer L will be likewise held should such a contingency as that described arise.

Figure 7:
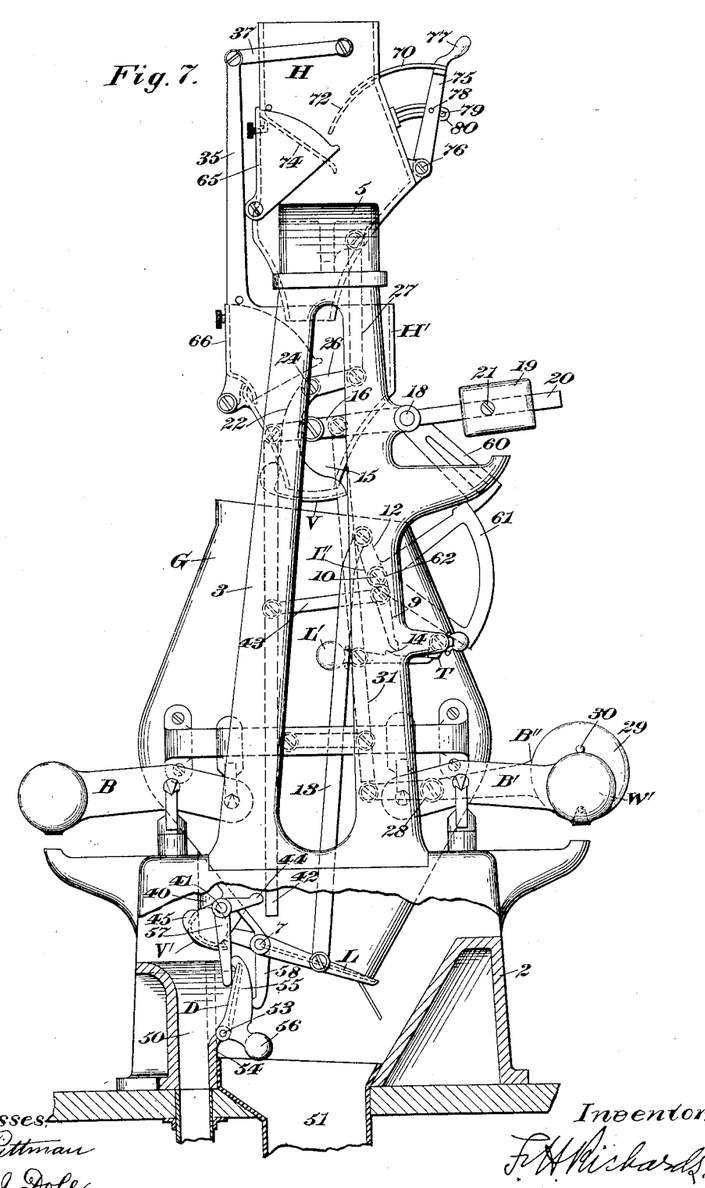

When the supply has been entirely cut off, the stop 60 will be swung across the path of oscillation of the stop 61, as shown in Figs. 5 and 7, so that when the closer L is opened the stop 61 will be swung about its center and its curved face will run substantially in contact with the coöperating stop 60, thereby to prevent the retraction of the latter, and hence the ascent of the hopper H' and the opening of the valve V. When the closer shuts, the stop 61 will be returned to its initial position to release the coöperating stop 60.

The hoppers H and H' are provided with doors 65 and 66, hinged, respectively, thereto and provided with hooked bolts or equivalent means to hold the same shut, said doors being opened when desired for the removal of any obstructions in the respective hoppers.

Means are preferably provided for regulating the speed of the machine and for also throwing the same out of action by governing the amount of material supplied thereto, or by entirely cutting it off, such means consisting in the present case of the reciprocatory check-valve 70, preferably hand-operated and curved in form, said valve passing through a suitable aperture, as 71, in the front of the hopper and working against the curved guide-tracks 72 on the opposite sides of said hopper, said valve 70 having a sufficient stroke to permit it to abut against the inclined plate 74 in the hopper.

For the purpose of manipulating the slide-valve 70 it is secured to the upper end of the hand-lever 75, pivoted at 76 to the front side of the hopper and furnished with a handle 77. Said hand-lever is furnished with a projecting threaded stud, as 78, passing through the curved guide-slot 79 in the segmental extension 80 on the hopper. By moving the slide-valve 70 toward and from the plate 74 the volume of the stream flowing from the hopper H can be varied and the valve can be maintained in a fixed position by a stop-nut (not shown) engaging the stud 78 and binding against the segmental extension 80.

Figure 11:
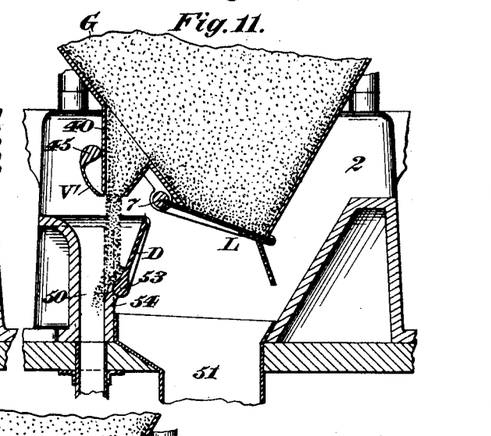
Figure 12:
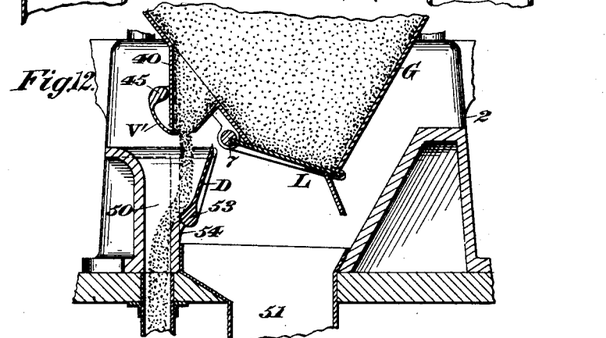
Figure 13:
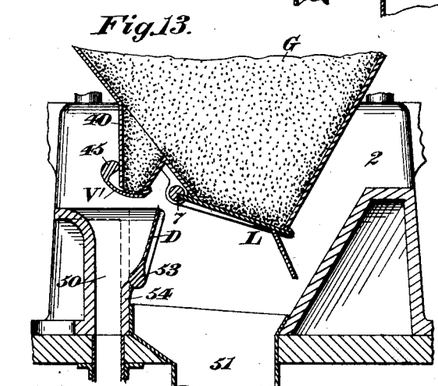
Figure 14:
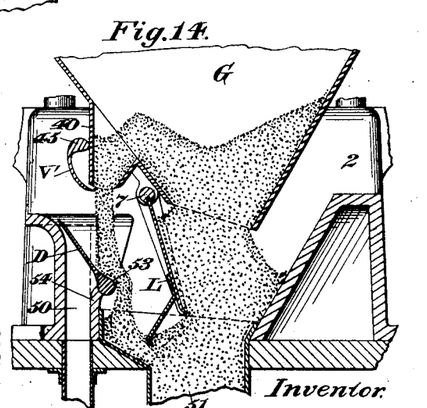
Figures 15, 16, 17, 18:
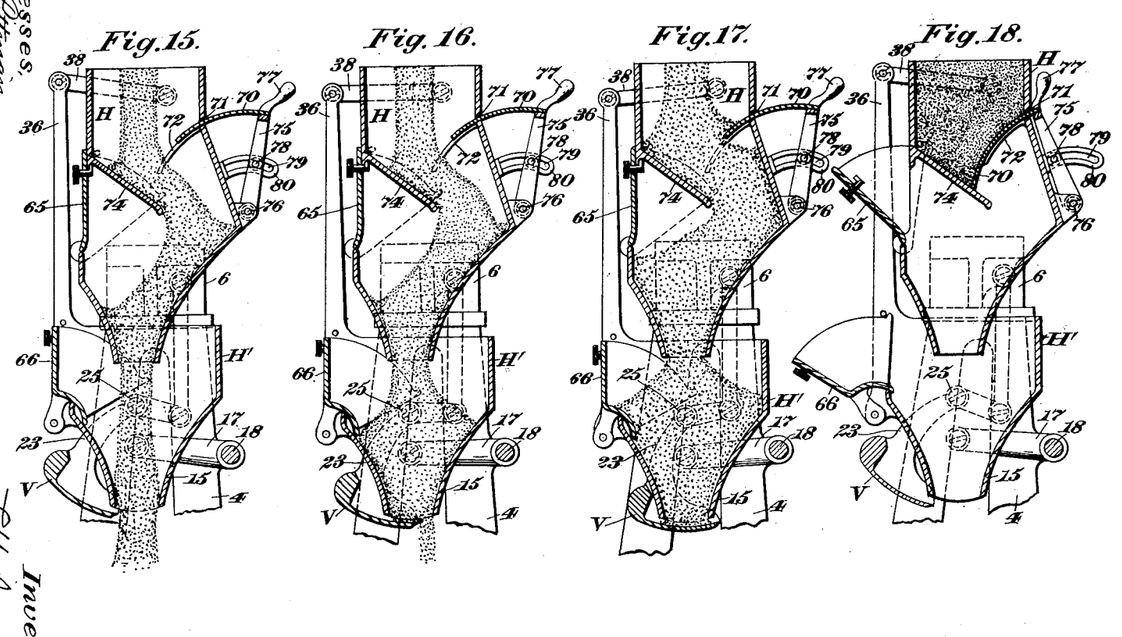
Figs. 15, 16, and 17 are longitudinal central sections of the supply apparatus in three different positions.
Fig. 18 is a similar view illustrating a check-valve in position to cut off the supply from the load-receiver.

The operation of the hereinbefore-described machine, briefly stated, is as follows: Fig. 4 represents the positions of the various parts at the commencement of operation, the hopper H' being at the limit of its upstroke and the valve V wide open, and the closer L and valve V' being in their shut positions, so that a stream of material from the hopper H will descend into the load-receiver, and when a certain percentage of the supply has been received said load-receiver, and consequently the beam mechanism, will descend, whereby the valve V, by reason of its connection with the framework, will be closed under the outlet of the hopper H' to cut off the stream therefrom. As the hopper descends and when the load-receiver is overloaded, as shown in Fig. 5, the thrust-rod 42, connected with said hopper, will swing the load-reducing valve V' open, as shown in Figs. 4 and 11, to permit the surplus to pass from the load-receiver and enter the conduit 50. As the material is withdrawn the load-receiver will rise, the rod 42 being moved therewith, so that the valve can close, as shown, respectively, in Figs. 6, 12, and 13, it being fully closed or shut in the last-mentioned figure to stop the withdrawal of material from the load-receiver. When the parts are in their highest positions, (shown in Fig. 4,) the latch L' will be above the coöperating tripper T on the framework, and when the load-receiver reaches the limit of its downstroke the latch will pass below its tripper. On the ascent of the load-receiver or the removal of the surplus and when the load-receiver reaches the so-called "poising-line" the latch L' will abut against the tripper T and will thereby be tripped, so that the closer L is opened to discharge the load into the conduit 51. As the load-receiver opens it will shift the rod 42 out of contact with the valve-arm 44, as represented in Fig. 7, and at a point beyond this operation the arm 58 of said closer will ride along the face of the cam 55 to cause the deflector D to cover the conduit 50, and said cam by acting against the valve-arm 57 will swing the valve V' open, as shown in Figs. 8 and 14, to permit the material in the load-reducing spout 40 and on the valve V' to pass therefrom and to the deflector D, the material from the spout entering the conduit 51 as it forms a part of the predetermined load. When the material is all discharged from the load-receiver G, the closer will shut and the several parts will resume their primary positions to repeat the operation.

Having described my invention, I claim—

1. The combination, with weighing mechanism; of overloading and load-reducing means, the overloading means embodying a movably-mounted hopper; and means coöperative with said hopper, for starting the load-reducing means in operation.

2. The combination, with weighing mechanism; of overloading and load-reducing means, the overloading means embodying a reciprocatory hopper; and means coöperative with said hopper, for starting the load-reducing means in operation.

3. The combination, with weighing mechanism; of overloading and load-reducing means, the overloading means embodying a movably-mounted valved hopper; and means coöperative with said hopper, for starting the load-reducing means in operation.

4. The combination, with weighing mechanism; of overloading and load-reducing means, the overloading means embodying a movably-mounted balanced hopper; and means coöperative with said hopper, for starting the load-reducing means in operation.

5. The combination, with weighing mechanism; of overloading and load-reducing means, the overloading means embodying a vertically-reciprocatory hopper; and means coöperative with said hopper, for starting the load-reducing means in operation.

6. The combination, with weighing mechanism; of overloading and load-reducing means, the overloading means embodying a movably-mounted hopper; a valve controlling the passage of material from said hopper; and means coöperative with said hopper, for starting the load-reducing means in operation and for also closing said valve.

7. The combination, with weighing mechanism; of overloading and load-reducing means, the overloading means embodying a movably-mounted hopper; a valve connected with said hopper; a link connected with the valve and with a resistance device; and means coöperative with the movably-mounted hopper, for starting the load-reducing means in operation.

8. The combination, with weighing mechanism; of overloading and load-reducing means, the overloading means embodying a movably-mounted hopper; a valve pivoted to said hopper; a link connected, respectively, with the valve and the framework; and means coöperative with said hopper, for starting the load-reducing means in operation.

9. The combination, with weighing mechanism; of overloading and load-reducing means, the overloading means embodying a movably-mounted hopper and the load-reducing means embodying a valve; and means coöperative with said hopper, for operating the valve.

10. The combination, with weighing mechanism; of overloading and load-reducing means, the overloading means embodying a movably-mounted hopper and the load-reducing means embodying a valve carried by the weighing mechanism; and means coöperative with said hopper, for operating the valve.

11. The combination, with weighing mechanism including a load-receiver having a spout; of overloading and load-reducing means, the overloading means embodying a movably-mounted hopper and the load-reducing means embodying a valve adapted normally to cover the outlet of the spout; and means coöperative with the hopper, for opening said valve at a predetermined stage.

12. The combination, with weighing mechanism including a load-receiver, of a movably-mounted hopper having a reduced end; a valve connected, respectively, with the hopper and the framework; a valve mounted on the load-receiver; a rod connected with the hopper and adapted to engage a device coöperative with the last-mentioned valve, to open the same at a predetermined stage.

13. The combination, with weighing mechanism including a load-receiver; of overloading and load-reducing means, the overloading means embodying a movably-mounted hopper; means coöperative with said movably-mounted hopper, for starting the load-reducing means in operation; and a fixed hopper located above the movably-mounted hopper, to supply the same with material.

14. The combination, with weighing mechanism including a load-receiver; of overloading and load-reducing means embodying a movably-mounted hopper, and the load-reducing means being carried by the load-receiver; and means coöperative with said hopper, for starting the load-reducing means in operation.

15. The combination, with weighing mechanism including a load-receiver, of a valve; a shaft carrying the valve and supported by the load-receiver, said shaft being furnished with an arm; a reciprocatory hopper; and a device connected with the reciprocatory hopper, for engaging said arm to operate the valve.

16. The combination, with weighing mechanism including a load-receiver, of a reciprocatory hopper; a shaft having arms connected with the hopper; a valve; a second shaft for carrying the valve, said latter shaft being supported by the load-receiver and provided with an arm; and a rod connected with one of the first-mentioned arms and adapted to engage the last-mentioned arm.

17. The combination, with weighing mechanism including a load-receiver, of a reciprocatory hopper; a shaft having forwardly-extending arms pivoted to the hopper and a rearwardly-extending arm furnished with a weight; a valve; a shaft for carrying said valve, said shaft being supported by the load-receiver; and a rod connected with one of the first-mentioned arms and adapted to engage the last-mentioned arm to open the valve.

18. The combination, with weighing mechanism including a load-receiver, of a valve carried by the load-receiver; an actuator for the valve; a device located between the actuator and the valve, for transferring the power of the former to the latter; and means for shifting said device.

19. The combination, with weighing mechanism including a load-receiver, of a valve carried by the load-receiver; an actuator for the valve; a rod situated between the actuator and the valve, for transferring the power of the former to the latter; and means for shifting said rod.

20. The combination, with weighing mechanism including a load-receiver, of a valve carried by the load-receiver; a movably-mounted hopper, constituting an actuator, for the valve; a rod situated between the hopper and the valve; and means for shifting said rod.

21. The combination, with weighing mechanism including a load-receiver, of a valve carried by the load-receiver; an actuator for the valve; a device situated between the actuator and the valve, for transferring the power of the former to the latter to operate the valve; means for shifting said device; and independent means for opening the valve when said device is shifted.

22. The combination, with weighing mechanism including a load-receiver, of a valve carried by the load-receiver; an actuator for the valve; a rod situated between the actuator and the valve, for transferring the power of the former to the latter; means for shifting the rod; and means independent of the rod, for operating the valve.

23. The combination, with weighing mechanism including a load-receiver, of a valve carried by the load-receiver; an actuator for the valve; a rod situated between the actuator and the valve, for transferring the power of the former to the latter, thereby to open said valve; means for shifting said rod, to permit the valve to close; and a device independent of the actuator, for opening the valve subsequent to the shifting of said rod.

24. The combination, with weighing mechanism including a load-receiver provided with a closer, of a valve carried by the load-receiver; an actuator for the valve; a rod connected with the actuator and adapted to transfer the power thereof to the valve, to open the same; means for shifting said rod; and a device connected with the closer and adapted to open the valve when the rod is shifted.

25. The combination, with weighing mechanism including a load-receiver, of a valve mounted on the load-receiver; a pair of arms connected with the valve; a valve-actuator; a device adapted normally to engage one of said arms and connected with the valve-actuator; instrumentalities for shifting the device out of operative relation with said arm; and means for engaging the other arm of the valve when the device is shifted.

26. The combination, with weighing mechanism including a load-receiver provided with a closer, of overloading and load-reducing means; a plurality of conduits; a deflector controlling the passage of material into said conduits; and means operative with the closer, for simultaneously actuating the deflector and load-reducing means.

27. The combination, with weighing mechanism including a load-receiver, of overloading means therefor; a load-reducing valve; an actuator; a rod for transferring the effect of the actuator to the valve; and means for successively shifting the rod and opening the valve.

28. The combination, with weighing mechanism including a load-receiver provided with a closer, of overloading means; a load-reducing valve; an actuator; a rod for transferring the power of the actuator to the valve; and means connected with the closer, for successively shifting said rod and operating the valve.

29. The combination, with weighing mechanism including a load-receiver, of overloading means; a load-reducing valve; an actuator; a rod for transferring the power of the actuator to the valve; a plurality of conduits; a deflector for controlling the passage of material to said conduits; and means for shifting the rod and deflector and for opening the valve.

30. The combination, with weighing mechanism including a load-receiver, of overloading means; a load-reducing valve; a pair of arms; a plurality of conduits; a deflector controlling the passage of material to the respective conduits; a cam secured to the deflector and adapted to engage one of the arms; a rod in position to engage the other arm; an actuator connected with said rod; and means for shifting the latter.

31. The combination, with weighing mechanism including a load-receiver having a closer, of a load-reducing valve; a plurality of conduits; a deflector controlling the passage of material to the respective conduits; a pair of arms connected with the valve; a cam secured to said deflector and adapted to engage one of the arms; a rod located to engage the other arm; an actuator connected with said rod; and an arm on the closer, for engaging said cam.

32. The combination, with weighing mechanism including a load-receiver, of overloading means therefor; a rocker; a load-reducing valve mounted on the load-receiver; an actuator for the load-reducing valve; and a device located between the actuator and the load-reducing valve and connected with the rocker.

33. The combination, with weighing mechanism including a load-receiver having a closer, of a rocker connected with said closer; a load-reducing valve mounted on the load-receiver; an actuator; a rod for transferring the power of the actuator to the valve, said rod being connected with the rocker; and means independent of the actuator, for operating the valve.

34. The combination, with weighing mechanism including a load-receiver having a closer, of a load-reducing valve; an actuator; a rod for transferring the power of the actuator to the valve; an arm; a cam for engaging said arm; an arm on the closer, coöperative with said cam; and means for shifting said rod.

FRANCIS H. RICHARDS.

Witnesses:
F. N. CHASE,
ANDREW FERGUSON.